United States Patent
Chishima et al.

(10) Patent No.: US 9,133,778 B2
(45) Date of Patent: Sep. 15, 2015

(54) FUEL SUPPLY DEVICE

(71) Applicant: HONDA MOTOR CO., LTD., Tokyo (JP)

(72) Inventors: Hiroshi Chishima, Saitama (JP); Hirotsugu Kudo, Saitama (JP); Masayoshi Kawaguchi, Saitama (JP); Kenji Shigetoyo, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 412 days.

(21) Appl. No.: 13/777,193

(22) Filed: Feb. 26, 2013

(65) Prior Publication Data

US 2013/0263825 A1     Oct. 10, 2013

(30) Foreign Application Priority Data

Apr. 6, 2012  (JP) ................. 2012-087646

(51) Int. Cl.
  *F02B 43/00* (2006.01)
  *F02D 19/06* (2006.01)
  *F02M 43/00* (2006.01)
  *F02M 25/08* (2006.01)

(52) U.S. Cl.
  CPC ........ *F02D 19/0602* (2013.01); *F02D 19/0649* (2013.01); *F02D 19/0665* (2013.01); *F02M 2025/0863* (2013.01); *Y02T 10/36* (2013.01)

(58) Field of Classification Search
  CPC ................ F02M 2025/0863; F02M 25/089; F02D 19/0602; F02D 19/0639; F02D 19/0649; F02D 19/0665; F02D 19/0668; F02D 19/0671

USPC ............ 123/1 A, 3, 431, 468, 514, 515, 516, 123/518, 519, 520, 495
See application file for complete search history.

(56) References Cited

U.S. PATENT DOCUMENTS

| | | | |
|---|---|---|---|
| 7,845,315 B2 * | 12/2010 | Leone et al. .................. | 123/1 A |
| 8,273,164 B2 * | 9/2012 | Makino et al. ................. | 96/134 |
| 2009/0159057 A1 * | 6/2009 | Pursifull et al. ............... | 123/575 |
| 2013/0036990 A1 * | 2/2013 | Chishima et al. ................ | 123/3 |
| 2013/0160745 A1 * | 6/2013 | Kawaguchi et al. .......... | 123/515 |
| 2013/0174808 A1 * | 7/2013 | Kudo et al. .................... | 123/445 |
| 2013/0263825 A1 * | 10/2013 | Chishima et al. .............. | 123/495 |
| 2013/0333644 A1 * | 12/2013 | Shigetoyo et al. ........... | 123/41.08 |

(Continued)

FOREIGN PATENT DOCUMENTS

| | | |
|---|---|---|
| JP | 2007-278298 | 10/2007 |
| JP | 2009-144720 | 7/2009 |
| JP | 2009-203909 | 9/2009 |

*Primary Examiner* — Hai Huynh
*Assistant Examiner* — Gonzalo Laguarda
(74) *Attorney, Agent, or Firm* — Squire Patton Boggs (US) LLP

(57) ABSTRACT

A device capable of supplying an internal combustion engine with fuel while improving the utilization rate of vaporized fuel. A temporary transition from a third state (primary recovery path FL1: closed, secondary recovery path FL2: closed, second vaporized fuel path VL2: closed, condenser 30: decompressed) to a fourth state (primary recovery path FL1: closed, secondary recovery path FL2: closed, second vaporized fuel path VL2: open, condenser 30: decompressed) is achieved. This temporarily increases an internal air pressure P of a condenser 30, and the kinetic energy of a vaporized fuel V leaked out of a first fuel tank 40 through the second vaporized fuel path VL2 is able to sweep away a first fuel F1 in a liquid state accumulated in a vacuum pump 36 to the first fuel tank 40.

4 Claims, 5 Drawing Sheets

(56) References Cited

U.S. PATENT DOCUMENTS

| | | | |
|---|---|---|---|
| 2014/0007842 A1* | 1/2014 | Kudo et al. | 123/445 |
| 2014/0041642 A1* | 2/2014 | Tsutsumi et al. | 123/541 |
| 2015/0068123 A1* | 3/2015 | McAlister | 48/197 FM |

* cited by examiner

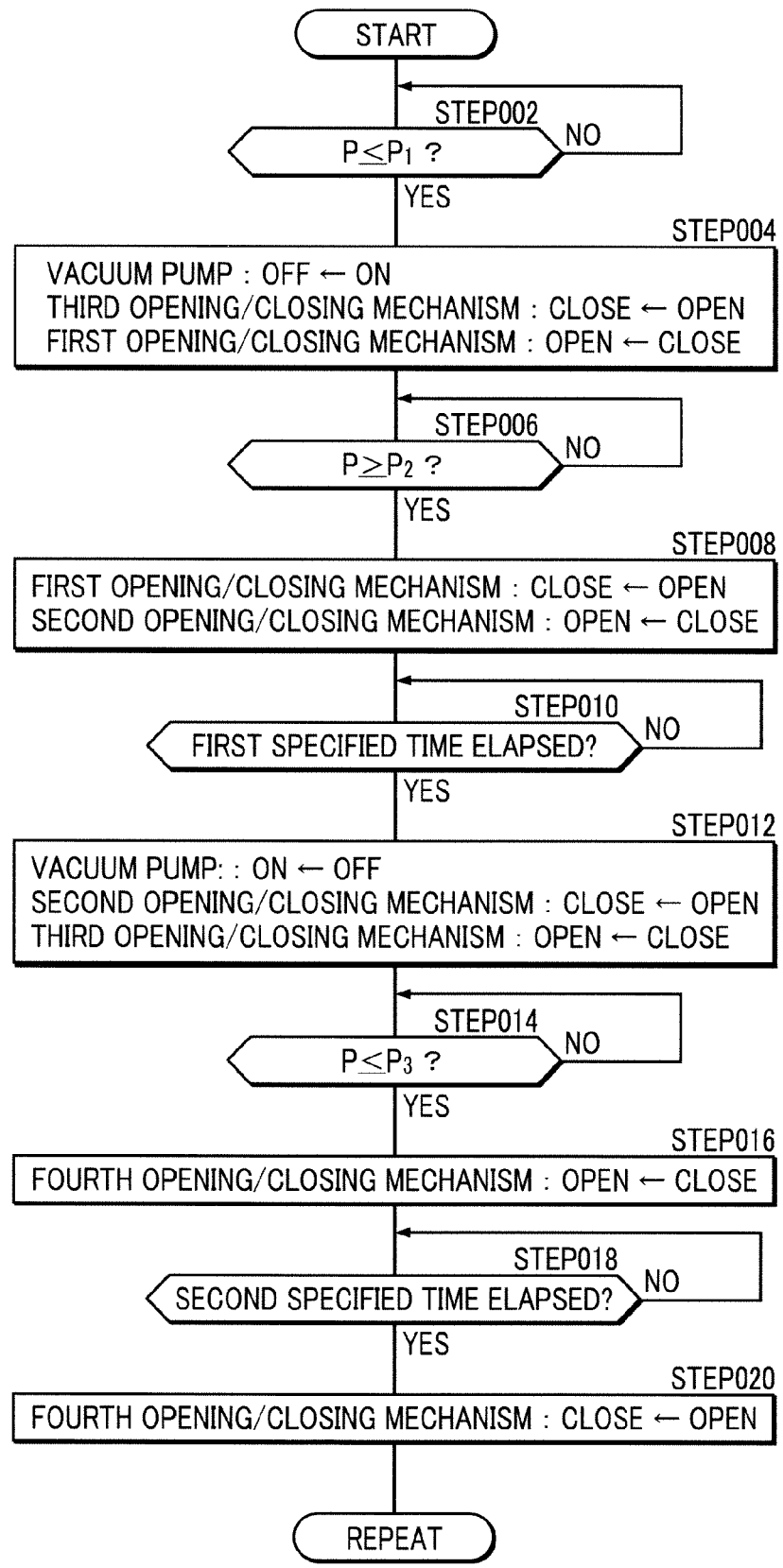

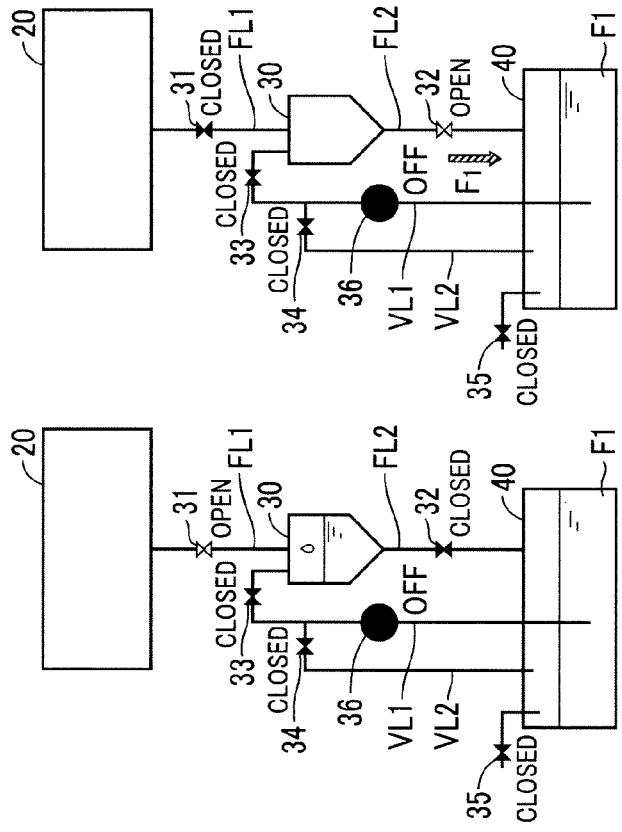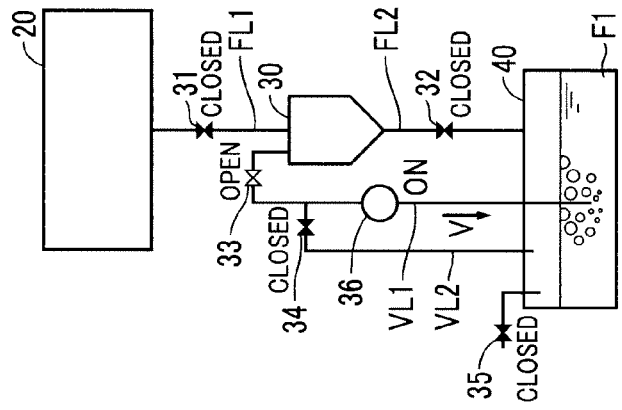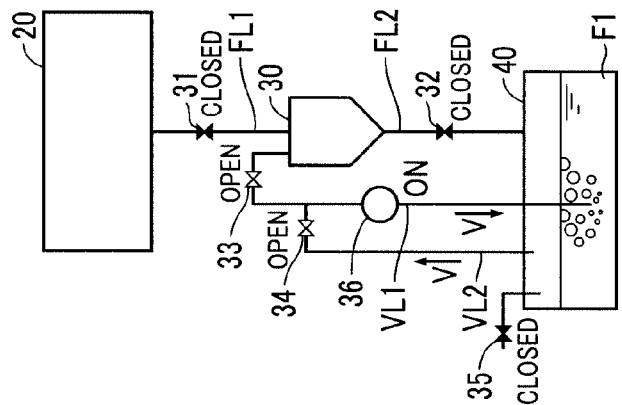

FUEL SUPPLY DEVICE

BACKGROUND OF THE INVENTION

1. Field of the Invention

The present invention relates to a technique for supplying fuel to an internal combustion engine.

2. Description of the Related Art

There have been proposed techniques for selectively supplying each of a high octane number fuel and a low octane number fuel separated from a raw fuel to an internal combustion engine (Refer to Japanese Patent Application Laid-Open No. 2007-278298 and Japanese Patent Application Laid-Open No. 2009-144720).

Moreover, there has been proposed a technique for preventing air from entering a tank for storing a high octane number fuel, which is caused by low volatile of the high octane number fuel in comparison with the raw fuel (Refer to Japanese Patent Application Laid-Open No. 2009-203909). Specifically, a device is configured so that vaporized fuel is supplied from a raw fuel tank to the high octane number fuel tank and then supplied from the high octane number fuel tank to a charcoal canister.

As the adsorption capacity of the canister is greater, a larger amount of vaporized fuel is able to be efficiently used for the running of the internal combustion engine. Due to a restriction on a space where the canister is mounted in a vehicle, however, the adsorption capacity is limited. Accordingly, in the case where a large amount of vaporized fuel occurs, the vaporized fuel which has been unsuccessfully adsorbed to the canister is discharged to the outside of the vehicle and thus wasted.

SUMMARY OF THE INVENTION

Therefore, it is an object of the present invention to provide a device which supplies fuel to an internal combustion engine while improving the utilization rate of vaporized fuel.

The present invention relates to a device which supplies an internal combustion engine with a first fuel which contains a larger number of high octane number components than a raw fuel and a second fuel which contains a larger number of low octane number components than the raw fuel or the raw fuel selectively or with a specified mixing ratio simultaneously, where the first fuel and the second fuel are separated from the raw fuel.

The fuel supply device of the present invention includes: a raw fuel tank storing the raw fuel; a separator configured to separate the raw fuel supplied from the raw fuel tank into the first fuel and the second fuel; a condenser configured to condense the first fuel which is separated by the separator and supplied from the separator through a primary recovery path; a first fuel tank configured to store the first fuel which is condensed by the condenser and supplied from the condenser through a secondary recovery path; a vacuum pump which is provided on a first vaporized fuel path coupling the condenser to the first fuel tank and is configured to suck a vaporized fuel generated by vaporization of the first fuel from the condenser and thereafter to supply the vaporized fuel to the first fuel tank; an opening/closing mechanism which opens and closes each of the primary recovery path, the secondary recovery path, and a second vaporized fuel path which diverges from the first vaporized fuel path on an upstream side of the vacuum pump and communicates with the first fuel tank; and a controller configured to control the operations of the vacuum pump and the opening/closing mechanism.

According to the fuel supply device of the present invention, the separator separates the raw fuel into the first fuel and the second fuel. The first fuel is supplied in a vapor state from the separator to the condenser through the primary recovery path. At least a part of the first fuel is then condensed by the condenser and thereby the first fuel comes into a liquid phase state.

Moreover, the vaporized fuel derived from the first fuel is sucked from the condenser by the operation of the vacuum pump and thereafter is supplied to the first fuel tank through the first vaporized fuel path. In response to this, at least a part of the vaporized fuel transits in phase from the vapor phase to the liquid phase and is able to be stored as the first fuel in the first fuel tank. In this manner, the vaporized fuel is prevented from being discharged to the outside of a vehicle or the like in an unrecoverable and unusable form at the time of decompression of the condenser, thereby enabling the improvement in the utilization rate of the vaporized fuel.

Moreover, it is possible to achieve a temporary increase in internal air pressure of the condenser by a temporary switch of the second vaporized fuel path from open to closed. In addition, the kinetic energy of the vaporized fuel leaked out of the first fuel tank through the second vaporized fuel path is able to sweep away the first fuel in the liquid state accumulated in the vacuum pump to the first fuel tank.

As a result, it is possible to extend the operating time, to decrease the internal air pressure of the condenser, and to restore the vacuum suction function of the vacuum pump which tends to be saturated or decreased along with the retention of the first fuel in the liquid state. This increases the rate of decrease in the internal air pressure of the condenser and enables an increase in the fuel separation frequency or efficiency by the separator.

In the fuel supply device of the present invention, preferably the controller is configured to control the operations of the vacuum pump and the opening/closing mechanism so as to sequentially achieve: a first state in which the primary recovery path is open while the secondary recovery path and the second vaporized fuel path are closed and decompression of the condenser by the operation of the vacuum pump is stopped; a second state in which the secondary recovery path is open while the primary recovery path and the second vaporized fuel path are closed and decompression of the condenser by the operation of the vacuum pump is stopped; and a third state in which the primary recovery path, the secondary recovery path, and the second vaporized fuel path are closed and the condenser is decompressed by the operation of the vacuum pump, and so as to temporarily achieve a fourth state in which, in the middle of the third state, the primary recovery path and the secondary recovery path are closed while the second vaporized fuel path is open and the condenser is decompressed by the operation of the vacuum pump.

Preferably the fuel supply device of the present invention further includes a pressure sensor which measures an internal air pressure of the condenser, and in the fuel supply device, the controller is configured to control the operations of the vacuum pump and the opening/closing mechanism so as to achieve: a transition from the third state to the first state in a condition that the internal air pressure of the condenser represented by an output signal from the pressure sensor is equal to or lower than a first negative pressure; a transition from the first state to the second state in a condition that the internal air pressure of the condenser represented by the output signal from the pressure sensor is equal to or higher than a second negative pressure, which is higher than the first negative pressure; and a temporary transition from the third state to the fourth state in a condition that the internal air pressure of the condenser represented by the output signal from the pressure sensor is equal to or lower than a third negative pressure, which is between the first negative pressure and the second negative pressure, or that the rate of decrease in the internal air pressure is equal to or lower than a predetermined speed.

Preferably the fuel supply device of the present invention further includes another opening/closing mechanism which opens and closes a path which provides communication between the first fuel tank and the internal combustion engine or a canister configured to absorb the vaporized fuel, and in the fuel supply device, the controller is configured to control the operations of the vacuum pump and the another opening/closing mechanism.

According to the fuel supply device having the above configuration, the vaporized fuel filling the first fuel tank is directly or indirectly supplied to the internal combustion engine, thereby enabling the improvement in usage efficiency of the vaporized fuel.

BRIEF DESCRIPTION OF THE DRAWINGS

FIG. 2 is a flowchart illustrating a procedure for negative pressure control processing;

FIG. 3A is an explanatory diagram relating to a first state of a negative pressure control system, FIG. 3B is an explanatory diagram relating to a second state of the negative pressure control system, FIG. 3C is an explanatory diagram relating to a third state of the negative pressure control system, FIG. 3D is an explanatory diagram relating to a fourth state of the negative pressure control system;

DESCRIPTION OF THE PREFERRED EMBODIMENTS

Structure

Figure 1:
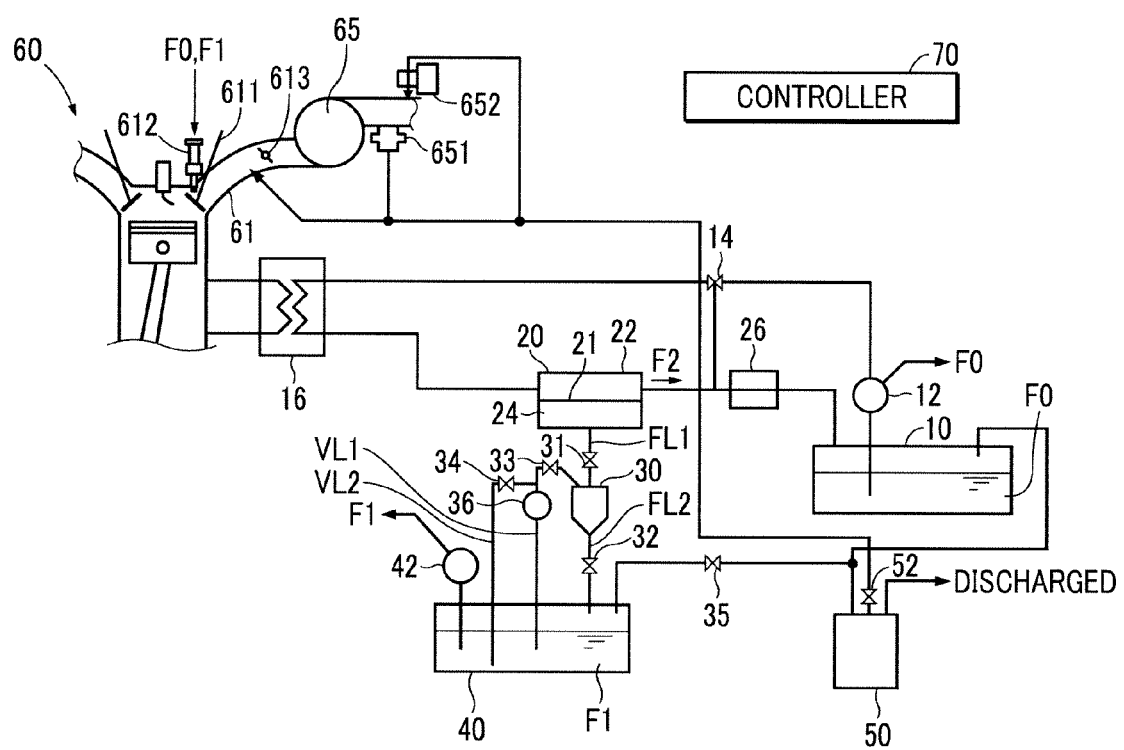
FIG. 1 is a configuration explanatory diagram illustrating a fuel supply device as one exemplary embodiment of the present invention.

The fuel supply device illustrated in FIG. 1 includes a raw fuel tank 10, a separator 20, a condenser 30, a first fuel tank 40, a canister 50, and a controller (or an electronic control unit [ECU]) 70. The fuel supply device is mounted on a vehicle and is configured to supply fuel to an internal combustion engine 60, which is mounted on the vehicle in the same manner.

The raw fuel tank 10 stores normal or commercially-available gasoline, which is supplied through a fill opening, as a raw fuel F0. The raw fuel F0 stored in the raw fuel tank 10 is increased in pressure up to a specified pressure by a high-pressure supply pump 12 and then supplied to the internal combustion engine 60 (not illustrated).

Moreover, after the increase in pressure up to the specified pressure by the high-pressure supply pump 12, the raw fuel F0 is heated by a heater 16 and then fed into the separator 20. If a three-way valve 14 shuts off the raw fuel tank 10 and the heater 16, the raw fuel F0 is returned to the raw fuel tank 10 via a radiator 26 without passing through the separator 20. The heater 16 is composed of a heat exchanger which performs heat exchange between cooling water in the internal combustion engine 60 and the raw fuel. The heater 16 may include an electric heater instead of or in addition to the heat exchanger.

The vaporization of the raw fuel F0 stored in the raw fuel tank 10 generates a vaporized fuel V which contains hydrocarbon and ethanol. The vaporized fuel V is supplied from the raw fuel tank 10 to the canister 50.

The separator 20 is configured to separate the raw fuel F0 into a first fuel F1 and a second fuel F2 in a pervaporation (PV) process. The separator 20 includes a separating film 21, which selectively causes high octane number components in the raw fuel (gasoline) to permeate the separating film 21, and a high-pressure chamber 22 and a low-pressure chamber 24, which are partitioned by the separating film 21 (not illustrated).

The first fuel F1 is a high octane number fuel which contains a larger number of high octane number components than the raw fuel F0, and it is, for example, alcohol such as ethanol. The second fuel F2 is a low octane number fuel which contains a smaller number of high octane number components than the raw fuel F0.

Specifically, the high-temperature and high-pressure raw fuel F0 is supplied to the high-pressure chamber 22 of the separator 20 while the low-pressure chamber 24 is maintained in a negative pressure state, by which the high octane number components contained in the raw fuel F0 permeate the separating film 21 and leach into the low-pressure chamber 24. Increase in the high octane number component amount of the raw fuel F0 increases the octane number of the permeation fluid, thereby enabling the recovery of the first fuel F1, which contains a large number of high octane number components with the octane number higher than the raw fuel F0, from the low-pressure side of the separating film 21.

Meanwhile, the high octane number component amount contained in the raw fuel F0 which flows into the high-pressure chamber 22 decreases as the raw fuel F0 flows down the stream. Therefore, the second fuel F2, which contains a small number of high octane number components with the octane number lower than the raw fuel F0, remains in the high-pressure chamber 22. The second fuel F2 leaked out of the separator 20 is cooled down in the radiator 26 and then supplied to the raw fuel tank 10.

Moreover, the operating conditions of the separator 20 are controlled such as the temperature of the separating film 21, the temperature and supply amount of the raw fuel F0, the pressure of the high-pressure chamber 22, the pressure (negative pressure) of the low-pressure chamber 24, and the like. This changes the separation speed or recovery amount of the first fuel F1 and the second fuel F2 of the separator 20.

For example, the heater 16 controls the temperature of the raw fuel F0 supplied to the separator 20, thereby enabling the adjustment of the temperature of the separating film 21. Moreover, the decompression of the condenser 30 by the operation of the vacuum pump 36 enables the adjustment of the pressure of the low-pressure chamber 24.

In addition, the fuel may be supplied to a second fuel tank (not illustrated) different from the raw fuel tank 10 and then stored in the second fuel tank. Moreover, the second fuel F2 stored in the second fuel tank may be supplied to the internal combustion engine 60, instead of the raw fuel F0.

The condenser (negative pressure tank) 30 is provided along a recovery path connecting the low-pressure chamber 24 of the separator 20 and the first fuel tank 40 and is configured to condense the first fuel F1. The condenser 30 is composed of, for example, an air-cooled or water-cooled tank or reservoir.

The condenser 30 is connected to the vacuum pump (negative pressure pump) 36 on the suction side thereof. The operation of the vacuum pump 36 controls the inside of the condenser 30 so as to be placed in the negative pressure state, thereby enabling the pressure of the inside to be lower than the vapor pressure of the first fuel F1. The vaporized fuel V containing alcohol such as ethanol generated by the vaporization of the first fuel F1 is supplied to the canister 50 by the operation of the vacuum pump 36. The condenser 30 is provided with a pressure sensor (not illustrated) for use in measuring the pressure of the inside of the condenser 30.

A primary recovery path FL1 connecting the separator 20 and the condenser 30 is provided with a first opening/closing mechanism 31 which opens and closes the primary recovery path FL1. The opening of the first opening/closing mechanism 31 provides communication between the low-pressure chamber 24 of the separator 20 and the condenser 30, while the closing of the first opening/closing mechanism 31 disconnects the separator 20 from the condenser 30.

A secondary recovery path FL2 connecting the condenser 30 and the first fuel tank 40 is provided with a second opening/closing mechanism 32 which opens and closes the secondary recovery path FL2. The opening of the second opening/closing mechanism 32 provides communication between the condenser 30 and the first fuel tank 40, while the closing of the second opening/closing mechanism 32 disconnects the condenser 30 from the first fuel tank 40.

The condenser 30 and the first fuel tank 40 are connected to each other by a first vaporized fuel path VL1, which is different from the secondary recovery path FL2. The first vaporized fuel path VL1 is provided with a third opening/closing mechanism 33 and a vacuum pump 36. The opening of the third opening/closing mechanism 33 and the operation of the vacuum pump 36 cause the vaporized fuel V to be introduced from the condenser 30 into the first fuel F1 stored in the first fuel tank 40.

The first vaporized fuel path VL1 is connected to the first fuel tank 40 via a second vaporized fuel path VL2, which diverges from the upstream side of the vacuum pump 36. The second vaporized fuel path VL2 is provided with a fourth opening/closing mechanism 34. The opening of the fourth opening/closing mechanism 34 with the third opening/closing mechanism 33 opened causes the vaporized fuel V filling the first fuel tank 40 to be introduced into the condenser 30 through the second vaporized fuel path VL2 and the first vaporized fuel path VL1.

The first fuel tank 40 stores the first fuel F1 separated from the raw fuel F0 by the separator 20. The first fuel F1 stored in the first fuel tank 40 is increased in pressure up to the specified pressure by a high-pressure supply pump 42 and then supplied to the internal combustion engine 60.

The vaporization of the first fuel F1 stored in the first fuel tank 40 generates a vaporized fuel V which contains alcohol such as ethanol. The first fuel tank 40 is connected to the canister 50 and a fifth opening/closing mechanism 35 is provided on the connection path. The opening of the fifth opening/closing mechanism 35 causes the vaporized fuel V to be supplied from the first fuel tank 40 to the canister 50 through the connection path.

The first fuel tank 40 is provided with a pressure sensor (not illustrated) for use in measuring the internal air pressure of the first fuel tank 40. Each of the opening/closing mechanisms 31 to 35 is composed of, for example, a solenoid valve. The operation and operation stop of the vacuum pump 36 enables the opening or closing of the first vaporized fuel path VL1, and therefore the third opening/closing mechanism 33 for opening or closing the first vaporized fuel path VL1 may be omitted.

The canister 50 has an adsorbent such as activated carbon built-in and the adsorbent adsorbs hydrocarbon in addition to alcohol contained in the vaporized fuel V derived from the raw fuel F0. Thereby, the vaporized fuel V is able to be separated into: alcohol and hydrocarbon; and nitrogen and other components.

The air containing the separated nitrogen and the like is discharged to the outside of the vehicle. Meanwhile, if an intake pipe 61 is placed in the negative pressure state after the internal combustion engine 60 starts running, the alcohol and hydrocarbon adsorbed to the adsorbent in the canister 50 are supplied to the intake pipe 61 on the downstream side of the throttle valve 613 and then introduced into a combustion chamber and burn. On an ejection path connected to the canister 50, there is provided a flow rate regulating valve 52 for regulating the flow rate of the vaporized fuel V in the ejection path.

The canister 50 may be configured to be heated by the condensation heat of the first fuel F1 generated in the condenser 30 so that the temperature is maintained within the temperature range in which the adsorption performance of the vaporized fuel V is able to be fully exerted. For example, the flow path of the medium may be configured so that the canister 50 is heated by a cooling medium of the condenser 30.

Along each path, there may be provided functional components which are not described and not illustrated, such as a reservoir or a heat exchanger.

The intake pipe 61 connected to a combustion chamber of the internal combustion engine 60 is provided with a intake valve 611, a fuel injection device 612, and a throttle valve 613. The opening of the intake valve 611 provides communication between the intake pipe 61 and the combustion chamber, while the closing of the intake valve 611 disconnects the intake pipe 61 from the combustion chamber. The throttle valve 613 is configured to adjust the intake air amount of the internal combustion engine 60.

The fuel injection device 612 is disposed between the intake valve 611 and the throttle valve 613 and is configured to selectively spray one of the raw fuel F0 and the first fuel F1 into each cylinder of the internal combustion engine 60. The fuel injection device 612 may be configured to spray both of the raw fuel F0 and the first fuel F1 with a specified mixing ratio simultaneously into each cylinder of the internal combustion engine 60. Alternatively, the fuel injection device 612 may be configured to spray the raw fuel F0 and the first fuel F1 separately from each other. A mixed gas of the air taken into the intake pipe 61 and the fuel sprayed from the fuel injection device 612 is introduced into the combustion chamber of each cylinder from the intake pipe 61.

In the case where a second fuel tank is provided, the fuel injection device 612 may be configured to selectively spray one of the first fuel F1 and the second fuel F2 or to spray both of the first fuel F1 and the second fuel F2 with a specified mixing ratio simultaneously into each cylinder of the internal combustion engine 60.

In the intake pipe 61, there are provided a turbocharger 65, a venturi gas mixer 651, and a purge pump 652 on the upstream side of the throttle valve 613. The vaporized fuel V is able to be supplied from the canister 50 to the intake pipe 61 via the purge pump 652 and the turbocharger 65.

The internal combustion engine 60 may be a naturally-aspirated engine, instead of the engine with the turbocharger 65. In this case, the vaporized fuel V may be supplied from the canister 50 to the intake pipe 61 on the downstream side of the throttle valve 613 via a purge control valve (not illustrated).

Further, the venturi gas mixer 651 may supply the vaporized fuel V directly from the condenser 30 to the intake pipe 61. Moreover, the vaporized fuel V may be supplied directly from the first fuel tank 40 to the intake pipe 61 of the internal combustion engine 60.

The controller 70 is composed of a programmable computer. The controller 70 receives output signals from various sensors for detecting various states of the fuel supply device, such as a pressure sensor which outputs a signal according to the internal air pressure P of the condenser 30 and the like. The controller 70 is programmed to perform "negative pressure control processing" described later. The controller 70 is programmed to perform arithmetic processing required for the fuel injection control, the ignition timing control, and the like of the internal combustion engine 60, the adjustment of the operating condition of the separator 20, the adjustment of the fuel supplied to the internal combustion engine 60, the operation control of each pump, the opening/closing or opening degree adjustment of each valve, and the like.

The term "programmed" means that an arithmetic processing device such as a CPU which is a component of a computer reads out software in addition to required information from a memory such as a ROM or a RAM or a recording medium and then performs arithmetic processing for the information according to the software.

(Function)

The functions of the fuel supply device having the above configuration will be described below. Specifically, the controller 70 performs "negative pressure control processing" repeatedly according to a procedure described below. Hereinafter, the description assumes that the fifth opening/closing mechanism 35 is closed.

Figure 4:
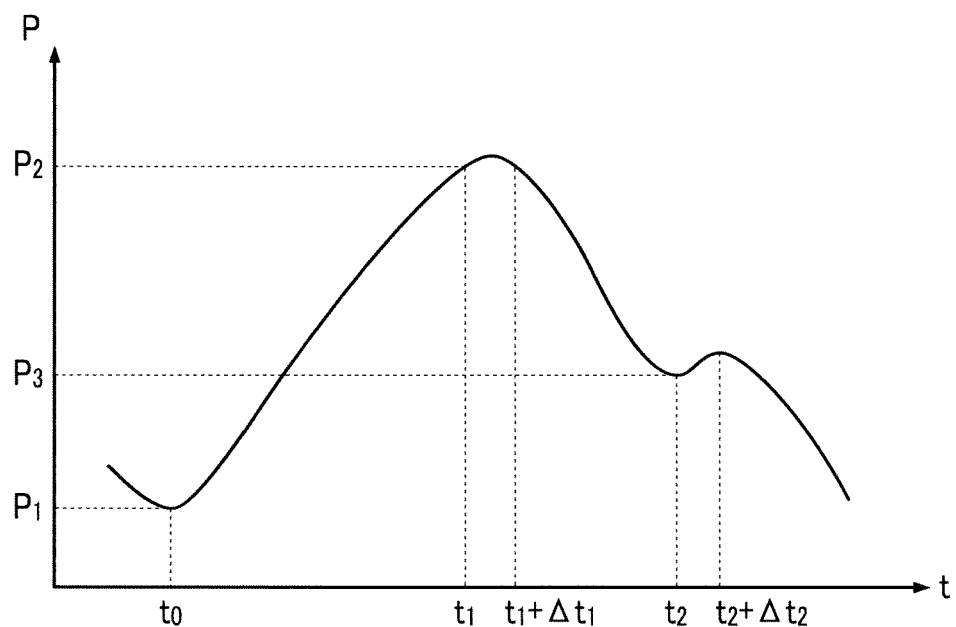
FIG. 4 is an explanatory diagram relating to a change in the internal air pressure of a condenser from the negative pressure control.

The vacuum pump 36 operates in the third state, by which the condenser 30 is decompressed and then the internal air pressure P gradually decreases (See the state before $t=t_0$ in FIG. 4). The term "third state" means a state where the primary recovery path FL1, the secondary recovery path FL2, and the second vaporized fuel path VL2 are closed and the condenser 30 is decompressed by the operation of the vacuum pump 36 (See FIG. 3C). In this state, the first vaporized fuel path VL1 is opened by the third opening/closing mechanism 33.

In this state, it is determined whether or not the internal air pressure P of the condenser 30 reaches the first negative pressure P1 or lower (STEP 002 in FIG. 2). The "negative pressure" is defined to be a negative value with the atmospheric pressure or normal pressure as a reference. Specifically, the more the pressure is lower than the atmospheric pressure, the absolute value of the negative value gets greater.

When the determination result is affirmative (YES in STEP 002 in FIG. 2 [See $t=t_0$ in FIG. 4]), the first opening/closing mechanism 31 is switched from the closed state to the open state, the third opening/closing mechanism 33 is switched from the open state to the closed state, and the operation of the vacuum pump 36 is stopped (STEP 004 in FIG. 2).

Thereby, as illustrated in FIG. 3A, there is achieved the "first state" in which the primary recovery path FL1 is open while the secondary recovery path FL2 and the second vaporized fuel path VL2 are closed and the decompression of the condenser 30 by the operation of the vacuum pump 36 is stopped.

The transition requirement from the third state to the first state may be defined according to the elapsed time from the time point at which the transition from the second-order or fourth state to the third state is achieved, instead of according to the internal air pressure P of the condenser 30. For example, in a condition that the elapsed time is equal to or longer than a specified time, the transition from the third state to the first state may be achieved.

In the first state, the separator 20 starts the separation into the first fuel F1 and the second fuel F2, and then the first fuel F1 is supplied from the separator 20 to the condenser 30 through the primary recovery path FL1. At least a part of the first fuel F1 is condensed (a phase transition from the vapor phase to the liquid phase) in the condenser 30 in the negative pressure and cooling state before the first fuel F1 is retained. Moreover, the vaporized fuel V increases in the condenser 30 and the internal air pressure P of the condenser 30 rises (See the state after $t=t_0$ in FIG. 4).

It is determined whether or not the internal air pressure P of the condenser 30 reaches the level equal to or higher than the second negative pressure P2, which is higher than the first negative pressure P1 (STEP 006 in FIG. 2). Since the "negative pressure" is defined as a negative value with the atmospheric pressure as a reference as described above, the absolute value of the second negative pressure P2 is smaller than the absolute value of first negative pressure P1.

When the determination result is affirmative (YES in STEP 006 in FIG. 2 [See $t=t_1$ in FIG. 4]), the first opening/closing mechanism 31 is switched from the open state to the closed state, while the second opening/closing mechanism 32 is switched from the closed state to the open state (STEP 008 in FIG. 2). Thereby, as illustrated in FIG. 3B, there is achieved the "second state" in which the primary recovery path FL1 and the second vaporized fuel path VL2 are closed while the secondary recovery path FL2 is open and the decompression of the condenser 30 by the operation of the vacuum pump 36 is stopped.

The transition requirement from the first state to the second state may be defined according to the elapsed time from the time point at which the transition from the third state to the first state is achieved, instead of according to the internal air pressure P of the condenser 30. For example, in a condition that the elapsed time is equal to or longer than a specified time, the transition from the first state to the second state may be achieved.

The respective values of the first negative pressure P1 and the second negative pressure P2 may be previously changed to various values, and the controller 70 may change the values according to the fuel supply device or the running state (acceleration requirement or the like) of the vehicle on which the fuel supply device is mounted. For example, the concentration or the content of the first fuel F1 of the raw fuel F0 stored in the raw fuel tank 10 is measured, and the second negative pressure P2 may be set to a higher level as the measured value is higher.

The first opening/closing mechanism 31 closes the primary recovery path FL1 and thus the low-pressure chamber 24 of the separator 20 is disconnected from the condenser 30, thereby causing a stop of the separation of the raw fuel F0 into the first fuel F1 and the second fuel F2 by the separator 20. The second opening/closing mechanism 32 opens the secondary recovery path FL2, by which the first fuel F1 in the liquid state retained in the condenser 30 is supplied to the first fuel tank 40 through the secondary recovery path FL2 (See the down-arrow in FIG. 3B).

After the achievement of the second state, it is determined whether or not a first specified time $\Delta t_1$ (for example, 10 [s]) elapsed (STEP 010 in FIG. 2).

When the determination result is affirmative (YES in STEP 010 in FIG. 2 [See $t=t_1+\Delta t_1$ in FIG. 4]), the second opening/closing mechanism 32 is switched from the open state to the closed state, while the third opening/closing mechanism 33 is switched from the closed state to the open state and the operation of the vacuum pump 36 is started (STEP 012 in FIG. 2). Thereby, the third state illustrated in FIG. 3C is achieved.

In the third state, the vaporized fuel V (gas) is supplied from the condenser 30 to the first fuel tank 40 through the first vaporized fuel path VL1 (See the down-arrow in FIG. 3C). The vaporized fuel V causes bubbling of the first fuel F1 in the first fuel tank 40, and at least a part of the vaporized fuel V in the bubbles can be brought into the first fuel F1 in the liquid state. In the first fuel tank 40, the first fuel F1 is placed in a two-phase state (vapor-liquid phase) and the supply of the vaporized fuel V from the condenser 30 causes pressure rising in the first fuel tank 40.

In addition, the vaporized fuel V may be supplied from the condenser 30 to a space filled with the vaporized fuel V similarly in the first fuel tank 40.

The operation of the vacuum pump 36 decreases the internal air pressure P of the condenser 30 (See the state after $t=t_1+\Delta t_1$ in FIG. 4). Here, it is determined whether or not the internal air pressure P of the condenser 30 reaches the level equal to or lower than the third negative pressure P3, which is higher than the first negative pressure P1 and lower than the second negative pressure P2 (STEP 014 in FIG. 2).

When the determination result is affirmative (YES in STEP 014 in FIG. 2 [See $t=t_2$ in FIG. 4]), the fourth opening/closing mechanism 34 is switched from the closed state to the open state (STEP 016 in FIG. 2). Thereby, as illustrated in FIG. 3D, there is achieved the "fourth state" in which the primary recovery path FL1 and the secondary recovery path FL2 are closed while the second vaporized fuel path VL2 is open and the condenser 30 is decompressed by the operation of the vacuum pump 36.

Additionally, the transition from the third state to the fourth state may be achieved in a condition that the rate of decrease |dP/dt| of the internal air pressure P is equal to or lower than a predetermined speed, instead of using the requirement that the internal air pressure P of the condenser 30 reaches the level equal to or lower than the third negative pressure P3, which is higher than the first negative pressure P1 and lower than the second negative pressure P2.

In the fourth state, the vaporized fuel V is supplied from the first fuel tank 40 to the condenser 30 through the second vaporized fuel path VL2 (See the up-arrow in FIG. 3D). Therefore, the internal air pressure P of the condenser 30 rises (See the state after $t=t_2$ in FIG. 4).

After achieving the fourth state, it is determined whether or not a second specified time $\Delta t_2$ (for example, 10 [s], which may be either the same as or different from the first specified time $\Delta t_1$) elapsed (STEP 018 in FIG. 2).

When the determination result is affirmative (YES in STEP 018 in FIG. 2 [See $t=t_2+\Delta t_2$ in FIG. 4]), the fourth opening/closing mechanism 34 is switched from the open state to the closed state (STEP 020 in FIG. 2). Thereby, the third state is achieved again, by which the internal air pressure P of the condenser 30 shifts from rising to falling (See the state after $t=t_2+\Delta t_2$ in FIG. 4).

Subsequently, the above series of processes are repeated (See STEP 002 to STEP 020 in FIG. 2).

Moreover, the controller 70 determines whether or not the open condition of the first fuel tank 40 is satisfied during execution of the negative pressure control processing. As the "open condition," it is possible to employ a condition that the measurement pressure of the first fuel tank 40 is equal to or higher than the threshold value or that there is a request to increase the speed of the vehicle exceeding the threshold value or a combination of these conditions.

When it is determined that the open condition is satisfied, the fifth opening/closing mechanism 35 is switched from the closed state to the open state and there is achieved the fifth-order state in which the path connecting the first fuel tank 40 to the canister 50 is open. In this process, for example, the first opening/closing mechanism 31, the second opening/closing mechanism 32, the third opening/closing mechanism 33, and the fourth opening/closing mechanism 34 are controlled to be placed in the closed state. In the fifth-order state, the vaporized fuel V is emitted from the first fuel tank 40 and adsorbed to the canister 50 and thereafter supplied to the internal combustion engine 60 through the intake pipe 61 as needed. The vaporized fuel V may be directly supplied to the internal combustion engine 60. This enables the improvement in usage efficiency of the vaporized fuel V.

According to the fuel supply device of the present invention, the separator 20 separates the raw fuel F0 into the first fuel F1 and the second fuel F2 in the first state (the primary recovery path FL1: open, the secondary recovery path FL2: closed, the second vaporized fuel path VL2: closed, the condenser 30: decompression stopped) (See STEP 004 in FIG. 2 and FIG. 3A). The first fuel F1 is supplied in the vapor state (in the form of a vaporized fuel) from the separator 20 to the condenser 30 through the primary recovery path FL1 and at least a part of the first fuel F1 is condensed in the condenser 30, by which the condensed fuel is retained in the liquid state.

Subsequently, in the second state (the primary recovery path FL1: closed, the second vaporized fuel path VL2: closed, the secondary recovery path FL2: open, the condenser 30: decompression stopped), the first fuel F1 in the liquid state is supplied from the condenser 30 to the first fuel tank 40 through the secondary recovery path FL2 (See STEP 008 in FIG. 2 and FIG. 3B).

Furthermore, in the third state (the primary recovery path FL1: closed, the secondary recovery path FL2: closed, the second vaporized fuel path VL2: closed, the condenser 30: decompressed), the vacuum pump 36 operates. Thereby, the vaporized fuel V is supplied from the condenser 30 to the first fuel tank 40 through the first vaporized fuel path VL1 (See STEP 012 in FIG. 2 and FIG. 3C).

In this process, the internal air pressure P of the condenser 30 decreases (See $t=t_1+\Delta t_1$ to $t_2$ in FIG. 4). At least a part of the vaporized fuel V transits in phase from the vapor phase to the liquid phase and is able to be stored as the first fuel F1 in the first fuel tank 40. In this manner, it is possible to prevent the vaporized fuel V from being discharged to the outside of the vehicle in an unrecoverable and unusable form at the time of decompression of the condenser 30, thereby enabling the improvement in the utilization rate of the vaporized fuel V.

Moreover, it is possible to achieve a temporary transition from the third state to the fourth state (the primary recovery path FL1: closed, the secondary recovery path FL2: closed, the second vaporized fuel path VL2: open, the condenser 30: decompressed) (See STEP 016 to STEP 020 in FIG. 2 and FIG. 3D).

This enables the internal air pressure P of the condenser 30 to be temporarily increased (See $t=t_2$ to $t_2+\Delta t_2$ in FIG. 4). Moreover, the kinetic energy of the vaporized fuel V leaked out of the first fuel tank 40 through the second vaporized fuel path VL2 is able to sweep away the first fuel F1 in the liquid state accumulated in the vacuum pump 36 to the first fuel tank 40. As a result, it is possible to extend the operating time, to decrease the internal air pressure of the condenser, and to restore the vacuum suction function of the vacuum pump 36 which tends to be saturated or decreased along with the retention of the first fuel F1 in the liquid state.

Accordingly, in the third state (See FIG. 3C) following the fourth state, the rate of decrease in the internal air pressure P of the condenser 30 is able to be increased (See the state after $t=t_2+\Delta t_2$ in FIG. 4). Furthermore, the fuel separation frequency or the efficiency of the separator 20 in the first state following the third state is able to be increased (See FIG. 3A).

Experimental Example

Figure 5:
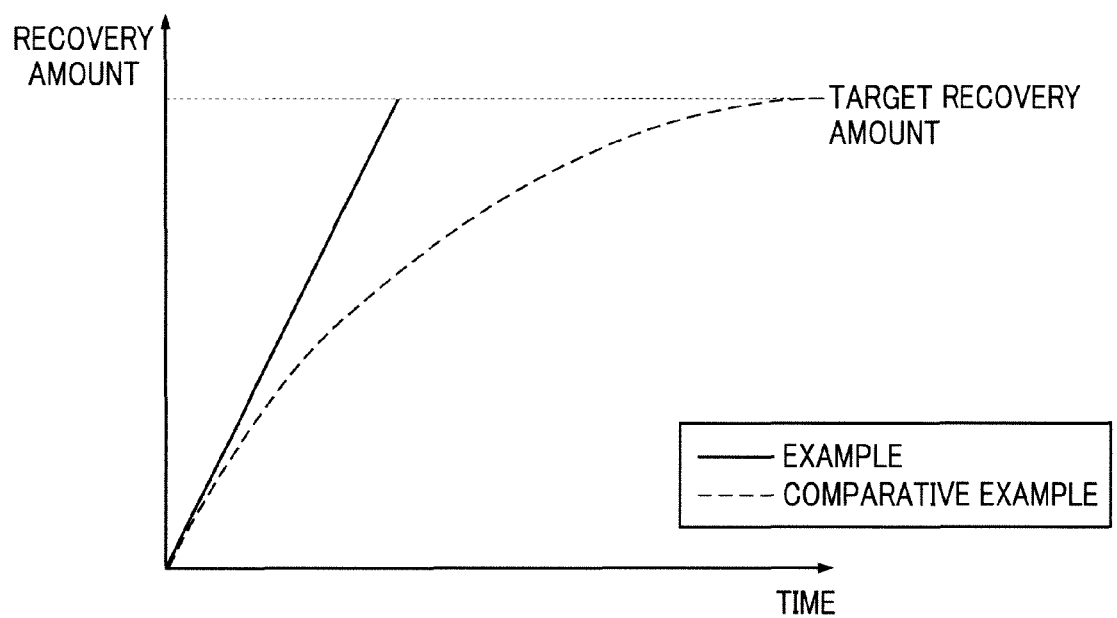
FIG. 5 is a comparative explanatory diagram relating to the recovery efficiency of a high octane number fuel.

In FIG. 5, there is illustrated a comparison in the recovery efficiency of the first fuel F1 (for example, ethanol) between an example of the present invention and a comparative example. An increased amount of the first fuel F1 in the first fuel tank 40 was measured as a recovery amount of the first fuel F1.

In the example, the "first state," the "second state," and the "third state" were repeatedly achieved as described above, and the negative pressure control processing was performed so that the transition to the "fourth state" is temporarily achieved every time the third state is achieved (See FIG. 2 and FIGS. 3A to 3D).

The comparative example differs from the example in that the second vaporized fuel path VL2 where the fourth opening/closing mechanism 34 is provided does not diverge from the first vaporized fuel path VL1, but is disposed so as to communicate with the first fuel tank 40 directly from the condenser 30. Moreover, the comparative example differs from the example in that the temporary transition to the "fourth state" is not achieved though the negative pressure control processing is performed so that the "first state," the "second state," and the "third state" are repeatedly achieved (See FIGS. 3A to 3C). Furthermore, the comparative example differs from the example in that the fourth opening/closing mechanism 34 is closed in the first-order and third states and opened in the second state.

From FIG. 5, it is apparent that the recovery efficiency or the recovery speed of the first fuel F1 in the example is higher than that of the comparative example. This means that the first fuel F1 is efficiently recovered because the function of the vacuum pump 36 is activated in response to the achievement of the temporary transition from the third state to the fourth state.

What is claimed is:

1. A fuel supply device which supplies an internal combustion engine with a first fuel which contains a larger number of high octane number components than a raw fuel and a second fuel which contains a larger number of low octane number components than the raw fuel or the raw fuel selectively or with a specified mixing ratio simultaneously, where the first fuel and the second fuel are separated from the raw fuel, the device comprising:
a raw fuel tank storing the raw fuel;
a separator configured to separate the raw fuel supplied from the raw fuel tank into the first fuel and the second fuel;
a condenser configured to condense the first fuel which is separated by the separator and supplied from the separator through a primary recovery path;
a first fuel tank configured to store the first fuel which is condensed by the condenser and supplied from the condenser through a secondary recovery path;
a vacuum pump which is provided on a first vaporized fuel path coupling the condenser to the first fuel tank and is configured to suck a vaporized fuel generated by vaporization of the first fuel from the condenser and thereafter to supply the vaporized fuel to the first fuel tank;
an opening/closing mechanism which opens and closes each of the primary recovery path, the secondary recovery path, and a second vaporized fuel path which diverges from the first vaporized fuel path on an upstream side of the vacuum pump and communicates with the first fuel tank; and
a controller configured to control the operations of the vacuum pump and the opening/closing mechanism.

2. The fuel supply device according to claim 1, wherein the controller is configured to control the operations of the vacuum pump and the opening/closing mechanism so as to sequentially achieve:
a first state in which the primary recovery path is open while the secondary recovery path and the second vaporized fuel path are closed and decompression of the condenser by the operation of the vacuum pump is stopped;
a second state in which the secondary recovery path is open while the primary recovery path and the second vaporized fuel path are closed and decompression of the condenser by the operation of the vacuum pump is stopped; and
a third state in which the primary recovery path, the secondary recovery path, and the second vaporized fuel path are closed and the condenser is decompressed by the operation of the vacuum pump,
and so as to temporarily achieve:
a fourth state in which, in the middle of the third state, the primary recovery path and the secondary recovery path are closed while the second vaporized fuel path is open and the condenser is decompressed by the operation of the vacuum pump.

3. The fuel supply device according to claim 2, further comprising a pressure sensor which measures an internal air pressure of the condenser,
wherein the controller is configured to control the operations of the vacuum pump and the opening/closing mechanism so as to achieve:
a transition from the third state to the first state in a condition that the internal air pressure of the condenser represented by an output signal from the pressure sensor is equal to or lower than a first negative pressure;
a transition from the first state to the second state in a condition that the internal air pressure of the condenser represented by the output signal from the pressure sensor is equal to or higher than a second negative pressure, which is higher than the first negative pressure; and
a temporary transition from the third state to the fourth state in a condition that the internal air pressure of the condenser represented by the output signal from the pressure sensor is equal to or lower than a third negative pressure, which is between the first negative pressure and the second negative pressure, or that a rate of decrease in the internal air pressure is equal to or lower than a predetermined speed.

4. The fuel supply device according to claim 3, further comprising another opening/closing mechanism which opens and closes a path which provides communication between the first fuel tank and the internal combustion engine or a canister configured to absorb the vaporized fuel, wherein the controller is configured to control the operations of the vacuum pump and the another opening/closing mechanism.

* * * * *